United States Patent [19]
Baguet

[11] Patent Number: 5,556,481
[45] Date of Patent: Sep. 17, 1996

[54] USE OF A COLOSTRUM OR BREAST MILK TO INHIBIT THE ACCUMULATION OF PROTEINS AT THE SURFACE OF SYNTHETIC POLYMERS USED IN CONTACT WITH BIOLOGICAL SYSTEMS; APPLICATION TO THE CARE OF CONTACT LENSES

[75] Inventor: Joel Baguet, Lyons, France

[73] Assignee: Essilor International, Paris, France

[21] Appl. No.: 560,619

[22] Filed: Nov. 20, 1995

Related U.S. Application Data

[62] Division of Ser. No. 268,046, Jun. 28, 1994, abandoned.

[51] Int. Cl.$^6$ .............................. C08L 89/00; C08L 5/00
[52] U.S. Cl. .............................. 134/26; 134/42; 134/901; 106/124.2

[58] Field of Search .................. 134/26, 42, 901; 106/139

[56] References Cited

U.S. PATENT DOCUMENTS 5,328,846  12/1994  Wedler .................... 435/264

*Primary Examiner*—David Brunsman
*Attorney, Agent, or Firm*—Robbins, Berliner & Carson

[57] ABSTRACT

The present invention relates to the use of a colostrum or breast milk of human or mammalian origin, to inhibit the accumulation of proteins at the surface of natural or synthetic polymers in contact with biological systems capable of containing proteins. A useful application is in the care of contract lenses.

15 Claims, 1 Drawing Sheet

USE OF A COLOSTRUM OR BREAST MILK TO INHIBIT THE ACCUMULATION OF PROTEINS AT THE SURFACE OF SYNTHETIC POLYMERS USED IN CONTACT WITH BIOLOGICAL SYSTEMS; APPLICATION TO THE CARE OF CONTACT LENSES

This application is a divisional application of Ser. No. 08/268,046, filed on Jun. 28, 1994 now abandoned.

The present invention relates to the use of a colostrum or a breast milk to inhibit the accumulation of proteins at the surface of synthetic polymers generally used in contact with biological systems capable of containing proteins. The invention relates, in particular, to the application of a colostrum or a breast milk for the cape of contact lenses of any type.

The present invention results from searches in the Laboratory of Meuse Optique Contact, Hospital of Bar-le-Duc, France.

Ophthalmic contact lenses generally consist of synthetic polymers. Two types of contact lenses exist: hydrophilic flexible lenses and rigid lenses.

Hydrophilic flexible lenses, also called hydrogels, are obtained from hydrophilic monomers such as hydroxyethyl methacrylate (HEMA), hydroxyethyl methyl methacrylate and vinylpyrrolidone, polymerized in the presence of crosslinking agents. Vinylpyrrolidone/methyl methacrylate copolymers have proved to be materials having a high hydrophilicity and very good mechanical properties. Lenses of this type are marketed by the company ESSILOR under the name "LUNELLE" and contain, in the hydrated state, 72% of water.

As examples of rigid lenses, there may be mentioned lenses obtained from polymers such as poly(methyl methacrylate) (PMMA) and acrylate silicone copolymers.

When a contact lens is placed on the eye of the wearer, it is covered with tears. In particular a pre-lens lachrymal film forms on the external surface and a post-lens layer of tears places itself at the interface between the cornea and the lens. A first layer of lachrymal components (mucin, proteins and lipids) adheres to the lens polymer and remains irreversibly adsorbed by exchange of thermodynamic energy. A second layer reversibly forms, leading to equilibrium of the lens in the lachrymal system.

A phenomenon of adsorption of the lachrymal proteins of this second layer to the surface of the polymer breaks this equilibrium. This adsorption results in the denaturation of the said proteins by ultraviolet radiation, by the surrounding oxidizing species and the surface energy. This denaturation results in the appearance of hydrophobic sites on the proteins which are responsible for their accumulation at the surface of the polymer.

The deposit of lachrymal proteins thus formed at the surface of the lens highly reduces visual acuity and the comfort of the wearer. In certain extreme cases, in the absence of lens care, an inflammatory and immune reaction of the eye to the protein deposits occurs and can cause an uncomfortable papillary conjunctivitis.

Moreover, for hydrophilic flexible lenses, their disinfection by boiling denatures further and coagulates the protein materials and leads to the formation of opaque white deposits adhering even more strongly to the surface of the lens.

Numerous cleaning processes and solutions have been used in order to remove the protein deposits already formed on the contact lenses. There are known in the state of the art especially processes comprising a mechanical rubbing of the lens, the use of ultrasound, the use of surface-active, hypertonic, enzymatic or oxidizing compositions. These treatments generally necessitate a disinfection, either chemically, or thermally, for example by boiling in a saline solution.

It turns out that the proteins adsorbed onto the surface of the lenses cannot be removed by conventional detergent compositions.

To guarantee a longer use of the contact lens, it is therefore essential to clean it regularly and to prevent the formation of lachrymal protein deposits which are difficult to remove, by means of a care procedure which is simple to implement and non-toxic for the ocular system.

The Applicant has discovered that a colostrum or a breast milk of human or animal origin inhibited the phenomenon of accumulation of proteins at the surface of synthetic polymers used in contact with biological systems, in particular the polymers of contact lenses.

The Applicant has discovered that the regular incubation of a contact lens in a solution of colostrum or breast milk made it possible to considerably reduce the accumulation of lachrymal proteins at the surface of the lens polymer, without toxic effect for the ocular system.

The subject of the present invention is therefore the use of a colostrum or a breast milk of human origin or of mammalian origin as agent which inhibits the accumulation of proteins at the surface of the synthetic polymers in contact with biological systems.

The invention relates more particularly to a solution for care of contact lenses based on colostrum or breast milk, which makes it possible to prevent in vitro the formation of deposits of lachrymal proteins on the surface of the lenses.

Another subject consists of a process for care of contact lenses using this solution.

Other subjects will appear in the light of the description and examples below.

The solutions for care of contact lenses in accordance with the present invention consist essentially of a solution of colostrum or breast milk of human or mammalian origin.

There are used more particularly human colostrum or breast milk or bovine colostrum obtained from dairy factories. The human breast milk can be used fresh or pasteurized.

The solutions of breast milk or colostrum according to the invention can be used in the pure state.

Preferably, solutions of breast milk or colostrum rendered lipid-free and partially casein-free according to the following treatment process:

a) a centrifugation of the milk or colostrum is carried out at 2800 g for 30 minutes at 4° C.;

b) the superficial liquids are removed;

c) the main liquid is recovered;

d) the liquid thus obtained is centrifuged at 15000 g for 30 minutes at the temperature of 4° C.;

e) the lipids at the surface are removed by aspiration and the resulting main liquid is recovered;

f) it is filtered on a 0.22 μm sieve;

g) it is optionally diluted in saline buffer medium of pH of about 7.4 until the desired concentration is obtained.

According to the present invention, the lipid-free solutions of milk or colostrum contain a protein concentration of less than or equal to 10 mg/ml, depending on whether they are pure or diluted in buffer medium as defined above.

The protein concentration is chosen as a function of the degree of hydrophilicity of the polymer of the lens to be treated. It is preferably between $10^{-3}$ mg/ml and 10 mg/ml, and more particularly between 0.01 and 1 mg/ml.

The solutions for care of contact lenses preferably contain a buffer agent of the mixed phosphate type, for example the combinations $Na_2HPO_4$, $NaH_2PO_4$ and $NaHCO_3$ or borate buffer.

The solutions according to the invention preferably exhibit a tonicity close to that of the lachrymal medium. The tonicity can be adjusted by addition of sodium chloride.

The solutions in accordance with the present invention may additionally contain other agents which inhibit the mechanisms responsible for the dirtying of the lenses, especially vitamins A, C and E and/or bendazac lysine.

Vitamins A, C and/or E are present in concentrations preferably of between 0.05% and 0.2% by weight relative to the total weight of the solution.

Bendazac lysine is used at concentrations preferably of between 0.05 and 2% by weight relative to the total weight of the solution.

It is [(1-(phenylmethyl)-1H-indazol-3-yl)oxy]-acetic acid, or $C_{16}H_{14}N_2O_3$. The product sold under the name ZILDASAC is preferably used.

Another subject of the invention consists in a process for care of contact lenses comprising the incubation, at room temperature, of the lens to be treated, in a solution as previously defined, for a period preferably of between 1 and 16 hours. The incubation can be followed by a rinsing in a buffer solution isotonic to the lachrymal medium before being replaced over the wearer's eye.

In the case of contact lenses made from hydrophilic polymers of high hydrophilicity, the inhibitory activity is further improved on the polymer surface treated with colostrum or milk, according to a treatment process of the invention comprising, in a first stage, the incubation of the lens in a hydrophobic organic liquid such as chloroform, for a period of a few seconds, preferably of the order of 5 to 15 seconds, followed by the incubation of the lens in a solution of colostrum or milk as previously defined, for a period preferably of between 1 and 16 hours.

Thus, any wearer of contact lenses can preserve himself from the deposition of lachrymal proteins on the surface of the lenses by carrying out, daily, one of these treatments under conditions which are simple to implement.

The solutions of breast milk or colostrum as previously defined can be used in numerous technical domains using synthetic polymers in contact with biological systems capable of containing proteins, especially in the food industry, the biomaterials industry, the field of appliances or instruments for medical or biological use.

The following examples are used to illustrate the invention without, however, being of a restrictive nature.

STUDY OF THE INHIBITORY POWER OF SOLUTIONS OF HUMAN COLOSTRUM ON THE ACCUMULATION OF LACHRYMAL PROTEINS AT THE SURFACE OF SYNTHETIC POLYMERS.

Four synthetic polymers were tested with:
a disc φ 13 mm made from polystyrene;
a hard contact lens made from poly(methyl methacrylate) (PMMA);
a flexible contact lens obtained from hydroxyethyl methacrylate (HEMA) containing 38% water;
a flexible contact lens made from vinylpyrrolidone/methyl methacrylate (NVP/PMMA) copolymer containing 72% water.

Each lens or disc is treated according to the following procedure:

a) a preincubation of the lens is carried out for 2 hours in 2 ml of a phosphate buffer solution, NaCl of pH 7.4, which will be called solution (T);

b) the lens is then immersed in 2 ml of solution of human colostrum rendered lipid-free according to the process described above and diluted in a solution (T). This solution has a total protein concentration of less than 10 mg/ml (10 mg/ml represents the concentration of a pure lipid-free solution of colostrum). The duration of incubation is 16 hours;

c) the lens is rinsed for 3 minutes in 2 ml of solution (T);

d) the lens is incubated for 4 hours in 2 ml of horseradish peroxidase-conjugated albumin diluted in a solution of artificial tear composed of 2.5 mg/ml of bovine albumin and 2.5 mg/ml of chicken egg lysozyme. The presence of the lens in the eye covered with tears is thus reconstituted.

For each type of polymer tested, labelled albumin is used at the "optimal concentration". This concentration corresponds to the concentration of half-amplitude measured on the curve representing the adsorption of labelled albumin onto the surface of the polymer as a function of the logarithm of the concentration of the lachrymal solution for incubation. This optimal concentration makes it possible to perform the finest possible measurements of adsorption;

e) three washes of 3 minutes are carried out in 2 ml of solution (T);

f) the lens is immersed in a solution which reveals the albumin-peroxidase marker system.

The labelled lens is allowed to incubate for 30 minutes, in the dark, in 1 ml of revealing solution containing 165 μl of 3,3',5,5'-tetramethylbenzidine (6 mg/ml in dimethyl sulphoxide DMSO) in 10 ml of 0.11M solution of sodium acetate adjusted to pH 5.5 with solid citric acid. The reaction is stopped with 500 μl of 4N sulphuric acid. A portion of this coloured solution is transferred into a well of a 96-well plate and the optical density OD of the lens is measured at 450 nm with the aid of a plate reader (VMax from Molecular Devices USA) and by means of an automated reading and a computer processing (Soft Max from Molecular Devices).

The optical density (OD) of the lens is linked to the adsorption level of labelled protein on the surface of the polymer, which reflects the total level of proteins adsorbed.

The maximum optical density ($OD_{max}$) corresponding to the maximum possible quantity of labelled protein adsorbed on the surface of the polymer is also measured.

The $OD_{max}$ value in fact corresponds to the optical density measured on the polymer non-treated with the solution of colostrum;

g) the percentage inhibition of the adsorption of the labelled protein is calculated by doing the ratio $$\left[ \frac{DO_{max} - DO}{DO_{max}} \right] \times 100$$

The higher the value of this ratio, the higher the inhibitory power of the solution of colostrum.

As controls, the experiment is carried out according to the procedure defined above:

(1) with the buffer solution (T), without carrying out the step of incubation in a solution of colostrum ($OD_{max}$; 0% inhibition)

(2) with a solution of proteins:

The colostrum solution of step (b) is replaced with a solution of purified proteins (albumin+lysozyme) or human serum diluted to a concentration equivalent to that of the colostrum.

Their inhibitory power on the adsorption of the labelled protein to the surface of each polymer is determined.

The results of these tests are represented partly in Table I and on the curves represented in FIGS. 1 and 2.

TABLE I

| | Inhibitory power on the adsorption of labelled albumin (%) | | | | |
|---|---|---|---|---|---|
| | Inhibitory solutions | | | | |
| | Solution (T) (control) | Solution of colostrum 0.01 mg/ml of protein | Solution of colostrum 0.1 mg/ml of protein | Solution of serum 0.01 mg/ml of protein | Solution of serum 0.1 mg/ml of protein |
| PMMA | 0 | 88.5 | 85.5 | 3 | |
| Polystyrene | 0 | 87.1 | 89.7 | 15.4 | 25.9 |
| HEMA 38% water | 0 | 45.2 | 55.4 | 1 | 4 |
| NVP/PMMA 72% water | 0 | 40.6 | 60.2 | 1 | 25 |

Figure 1:
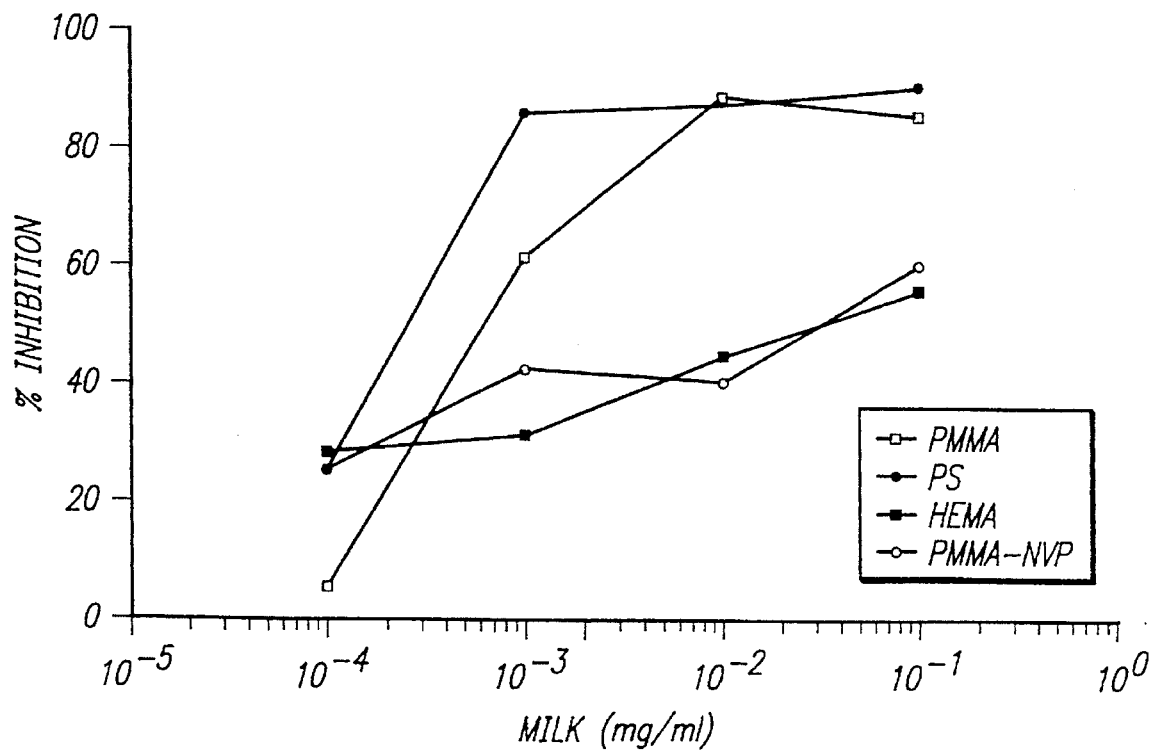
FIG. 1 represents the curves of variation of the percentage inhibition as a function of the concentration of proteins in the milk solution tested. Each curve is specific for the polymer tested.
Figure 2:
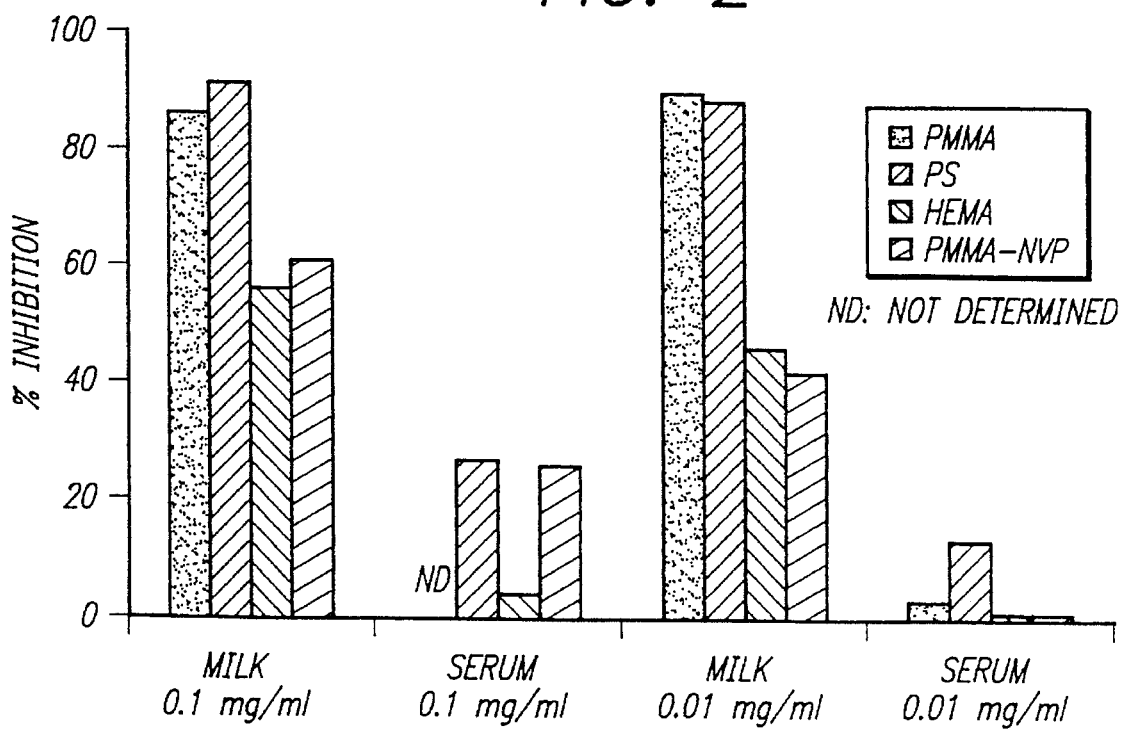
FIG. 2 represents the bar chart, for each polymer, of the inhibitory power of a milk solution having a protein concentration of 0.1 mg/ml or 0.01 mg/ml or of a serum solution diluted to a concentration equivalent to that of the colostrum.

It can be observed that for the hard polymers: polystyrene and PMMA, a preincubation of 16 hours in a colostrum solution at 0.01 mg/ml of proteins, provides an inhibition of the subsequent adsorption of the proteins of about 90%.

It can be noted that the preincubation of hydrophilic polymers:HEMA and NVP/PMMA for 16 hours in a colostrum solution at 0.1 mg/ml, leads to an inhibition of the order of 60%.

The inhibition provided by the proteins is of the order of 1 to 25%.

I claim:

1. Process for inhibiting the accumulation of proteins at the surface of a synthetic polymer which comprises contacting the surface of said synthetic polymer with a solution comprising colostrum or breast milk of human or mammalian origin.

2. Process according to claim 1, wherein said solution comprises breast milk or colostrum of human origin.

3. Process according to claim 2, wherein said solution human breast milk is fresh or pasteurized.

4. Process according to claim 1, wherein said solution comprises bovine milk or colostrum.

5. Process according to claim 4, wherein said solution comprises bovine colostrum.

6. Process according to claim 1, wherein said solution is lipid-free and has a protein concentration of between $10^{-3}$ and 10 mg/ml.

7. Process according to claim 6, wherein said solution has a protein concentration of between 0.01 and 1 mg/ml.

8. Process according to claim 7, wherein said solution further comprises a buffer medium of the phosphate or borate type whose pH is about 7.4.

9. Process according to claim 8, wherein said solution further comprises sodium chloride.

10. Process according to claim 9, wherein said solution further comprises an agent which inhibits the mechanisms for dirtying the synthetic polymer.

11. Process according to claim 10, wherein said additional inhibitory agent is chosen from vitamin A, vitamin C or vitamin E or lysine bendazac or mixture thereof.

12. Process according to claim 11, wherein the concentration of vitamins A, C and/or E is between 0.05 and 0.2% by weight and the concentration of bendazac lysine is between 0.05 and 2% by weight relative to the total weight of the composition.

13. Process according to claim 1, wherein said synthetic polymer is in the form of contact lenses.

14. Process for care of contact lenses, comprising the incubation, at room temperature, of the said lenses in a solution comprising colostrum or breast milk of human or mammalian origin, for a period of between 1 and 16 hours, followed by a rinsing in buffer solution isotonic to the lachrymal medium before being replaced over the eye of the wearer.

15. Process for care of contact lenses made from hydrophilic polymer at high degree of hydrophilicity, comprising the incubation of the said lenses in a hydrophobic organic liquid for a period of between 5 and 15 seconds, followed by the incubation in a solution comprising colostrum or breast milk of human or mammalian origin for a period of between 1 and 16 hours.

* * * * *